A. J. Shunk,
Horse Rake.

No. 44,020.  Patented Aug. 30, 1864.

Witnesses
R. T. Campbell
E. Shafer

Inventor
A. J. Shunk
by his Atty

UNITED STATES PATENT OFFICE.

A. J. SHUNK, OF SHANESVILLE, OHIO.

IMPROVEMENT IN HORSE-RAKES.

Specification forming part of Letters Patent No. 44,020, dated August 30, 1864.

*To all whom it may concern:*

Be it known that I, A. J. SHUNK, of Shanesville, county of Tuscarawas, and State of Ohio, have invented a new and Improved Wheel-Rake; and I do hereby declare that the following is a full, clear, and exact description thereof, reference being had to the accompanying drawings, making a part of this specification, in which—

Figure 1:
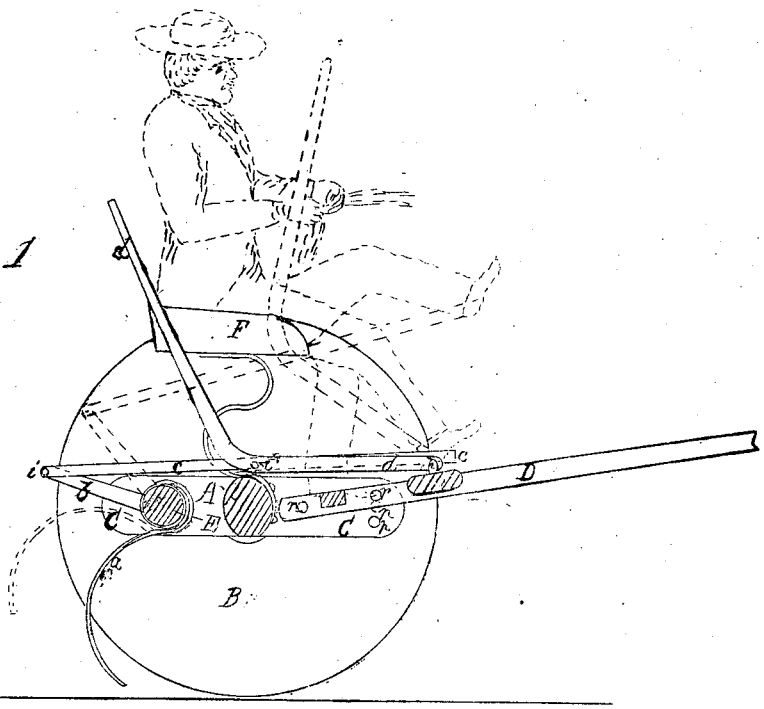
Figure 2:
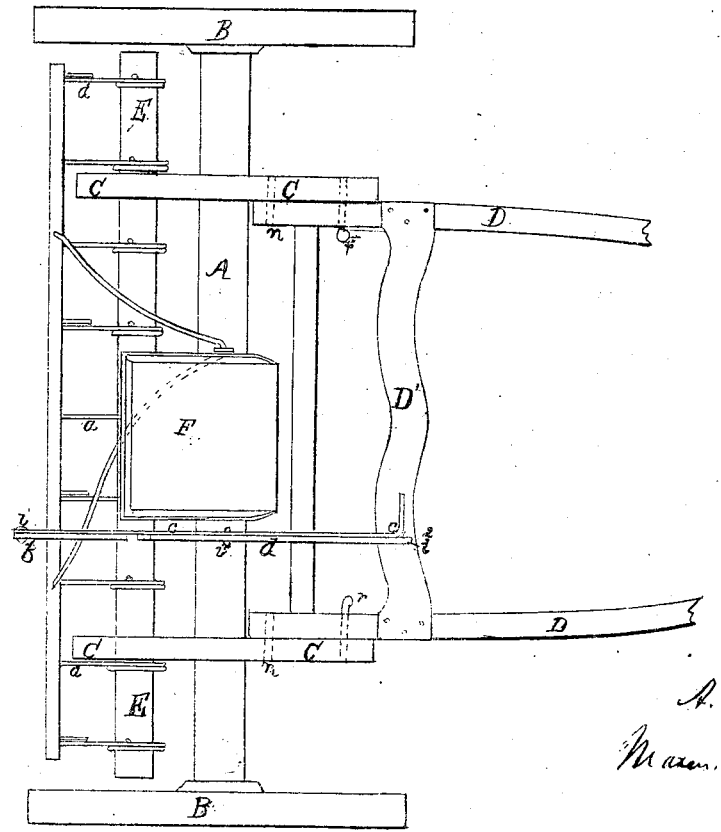

Figure 1 is a vertical longitudinal section of my improved rake. Fig. 2 is a top view of the rake.

Similar letters of reference indicate corresponding parts in both figures.

The object of my invention and improvements in horse or wheel rakes is to so apply the thills to the rake-frame that the teeth of the rake can be adjusted nearer to or farther from the ground, according to the character of the grass or other cut product, as will be hereinafter described.

Another object of my invention is to enable the driver to raise or depress the tines by means of a jointed lever and treadle so applied to a hinged or pivoted rake-head that the driver is enabled to hold the parts in raking position by the pressure of his foot, or to raise the same out of operative position by means of his hand, all as will be hereinafter described.

To enable others skilled in the art to make and use my invention, I will describe its construction and operation.

A represents the axle-tree, and B B the two carriage-wheels thereon.

C C are two beams, which are suitably framed to the axle-tree A, so as to extend out longitudinally in front and rear thereof. The forward extensions of these beams C C form hounds, by which to attach the thills D to the machine, and the rear ends of said beams form supports for the transverse rake-head E, as clearly shown in both figures of the drawings. The rake-head E is so applied to the extended supports C C as to rock in its bearings thereon, and to this head the rake-tines $a$ $a$ are applied by bending one of their ends, inserting this end in a hole made in the head, and then coiling the tine around the head, so as to form a kind of coiled spring, as represented in Fig. 1. This spring is kept in place and the tooth held in proper position by inserting pins into the head on each side of the coiled portion. The curvature of the teeth may be such as is found best suited to the purpose.

On one side of the driver's seat F, which is mounted on the axle A, is an arrangement of levers, whereby the driver can raise or depress the rake-tines, and thus throw the rake into and out of operation at pleasure. A short arm, $b$, is secured at one end to the rocking head E, and pivoted at its rear projecting end to the end of a lever-treadle, $c$, which is carried forward over the axle A, and furnished on its end with a foot-piece, upon which the driver, while seated in seat F, puts his foot, as indicated in red lines, Fig. 1. At an intermediate point between the ends of the lever $c$ a bent lever, $d$, is pivoted, one end of which is pivoted to the cross-tree D' of the thills, and the other end is carried up by the side of the driver's seat F, so that this end will be convenient to the driver. The relative position of the three pivot-connections $i$ $i'$ $i^2$ is such that when the rake is thrown down into its operative position the pivot-connection $i'$ will fall slightly below the points $i$ $i^2$ and the levers will rest at an intermediate point between their ends on the axle-tree A, and in this position it will be seen that the axle-tree will prevent the rake from rising. When the driver desires to throw the rake-teeth up, as indicated in red lines, Fig. 1, he releases the pressure on the forward end of lever $c$ and forces the upper end of bent lever $d$ forward and upward. At the same time he can raise the lever $c$ slightly with his foot.

It is not intended that the driver shall resist the upward or backward pressure of the rake when in operation, for this could not be conveniently done by the power of a single man. It is intended, though, that the driver shall prevent the levers $c$ $d$ from springing up in consequence of the jarring of the machine in traveling over rough land, and this he can do by pressing with his foot upon the forward extremity of the lever $c$, and thus keeing the joint at $i'$ down in its place on the axle-tree A, as above described.

In order to adapt my machine to work in different kinds of cut product, it is necessary that the raking ends of the teeth should be adjusted at different heights from the ground—*e.g.*, meadow-land should be raked very close, while clover-fields cannot be raked so close in consequence of the tufts and stubble, which would be caught by the rake-teeth.

To adjust the machine I pivot the rear ends of the thills to the hounds or projecting portions C C at $n$ $n$, and make a number of holes,

*p p*, through the hounds C C in the arc of a circle described from the pivot-connections *n n*, through which holes the pins *r r* are passed that enter holes in the thills.

It will be seen that when the pins *r* are passed into the lowest holes *p*, and the thills thus fixed rigidly to the hounds C C, the ends of the rake-teeth will be brought down closely to the surface of the ground in consequence of elevating the forward end of the frame. By withdrawing the pins *r r*, depressing the forward end of the frame, and then inserting these pins into the highest holes *p p*, the raking ends of the teeth will be elevated to the fullest extent above the surface of the ground by the forward adjusting arrangement. This adjustment can be best made when the horse is hitched to the machine and the forward ends of the thills supported by the horse.

Having thus described my invention, what I claim as new, and desire to secure by Letters Patent, is—

The arrangement of the levers *d c b* and rocking rake-head E, in combination with the adjustable rake-frame C, substantially as described.

A. J. SHUNK.

Witnesses:
DANIEL BATES,
G. Y. SPRINGER.